Feb. 26, 1952　　　F. G. ALBIN　　　2,587,081

PRESHAPING OF RECORDED WAVES

Filed Aug. 27, 1949

INVENTOR.
FREDERICK GEORGE ALBIN
BY Earl R. Graham

ATTORNEY

UNITED STATES PATENT OFFICE 2,587,081

PRESHAPING OF RECORDED WAVES

Frederick G. Albin, Beverly Hills, Calif., assignor to Radio Corporation of America, a corporation of Delaware Application August 27, 1949, Serial No. 112,826

10 Claims. (Cl. 179—100.3)

This invention relates to the recording and reproduction of sound records, and particularly to the recording of a pre-shaped wave on film to compensate for distortion introduced during processing.

In Dimmick U. S. Patent No. 2,074,049 of March 16, 1937, the distortion introduced by the limited resolving power of photographic record material, which varies with respect to frequency, has been described, and a type of system for introducing a modification in the original wave shape as impressed on the photographic material to counteract the distortion introduced by the processing operation has been described and claimed. The present invention is one which varies the waveform in accordance with the amplitude and frequency of the wave at any instant. In general, this is accomplished by a special network sensitive to both frequency and amplitude variations, varying both the waveform itself and the zero axis of the wave. In this manner, the exact amount of distortion can be introduced to compensate for the subsequent processing distortion so that the wave, upon reproduction, will be in accordance with the wave-form of the original signal.

The principal object of the invention, therefore, is to facilitate the recording and reproduction of sound.

Another object of the invention is to provide an improved method of and system for introducing a predetermined distortion of the instantaneous values of a signal wave.

A further object of the invention is to provide an improved filter network in a signal recording channel to provide a predetermined amount of wave shape modification.

A still further object of the invention is to provide an improved method of and system for shifting the zero axis of a wave-form and varying the instantaneous amplitude value thereof.

Although the novel features which are believed to be characteristic of this invention will be pointed out with particularity in the appended claims, the manner of its organization and the mode of its operation will be better understood by referring to the following description, read in conjunction with the accompanying drawings, forming part hereof, in which:

Figure 1:
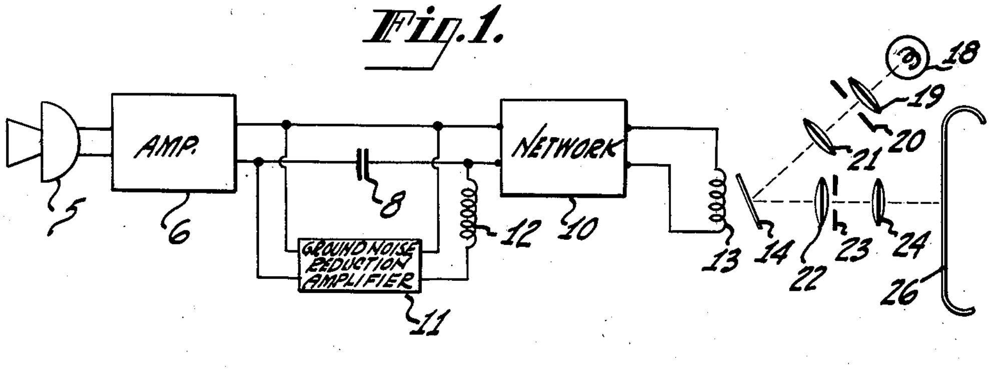
Fig. 1 is a block and schematic diagram of a recording system embodying the invention.

Referring now to the drawings, any type of signal source is represented by a microphone 5 connected to the input of amplifier 6. The output of the amplifier is connected through a blocking condenser 8 to a network 10, while bridged across this line, is the input of the usual type of ground noise reduction amplifier 11, the output of which is connected over a blocking inductance 12 to the input of network 10. The output of the ground noise reduction amplifier 11 is a direct current applied as a bias to a galvanometer winding 13 having a recording modulator mirror 14, which varies the mean track transmission in accordance with the level being recorded. The ground noise reduction amplifier is for the purpose of maintaining a good signal-to-noise ratio during reproduction. The series condenser 8 passes the signal from the source, but blocks the direct current bias from flowing back to the source, while inductor 12 passes the bias current from the ground noise reduction amplifier 11, but blocks the signal from flowing into the unit 11. Thus, the system from the microphone 5 to the network 10 is of the normal type, the invention including the new network unit 10 inserted prior to the galvanometer 13—14.

A photographic type of sound recording optical system is shown diagrammatically as having a light source 18, a condenser lens 19, an aperture plate 20, a projection lens 21, a condenser lens 22, a slit plate 23, and a projection lens 24. As shown by the broken line, light modulated by the mirror 14 is impressed on the sound track portion of the film 26.

In the process of photographic recording, the image resulting from exposing and processing the film is not a true replica of the size and shape of the exposed area, but suffers a growth in size to a degree depending upon the magnitude of exposure, development gamma, and density of the image. Furthermore, the proportional growth is dependent upon the size of the image or the wavelength of the recorded signal. The present invention counteracts or compensates for this image growth by altering the shape of the wave of the exposure in prediction of the image growth, so that the resulting wave image has a shape, which, upon processing, will correspond to the exact wave shape of the original signal.

Figure 4:
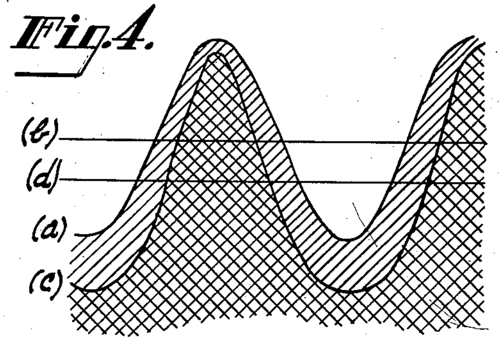
Fig. 4 is a view showing the type of distortion introduced by the system of Fig. 1.

As shown in Fig. 4, the curve *a* represents a wave of simple sinusoidal shape, which can be considered a wave as applied to the input of the network 10. The average or zero axis of this wave is shown by the line $b$, while the instantaneous values of the wave extend equally in positive and negative directions from this axis. Curve $c$ represents the shape, but not the amplitude, of the wave at the output of the network 10. The new axis is now different from the axis $b$, as shown by the line $d$. The difference between these axes is determined by the amplitude of the zero frequency component which the altered wave has when its shape is described mathematically by Fourier's series. Curve $c$ is the wave shape of the signal as applied to the light modulator 13—14 and to the light variations applied to the film, which results in an image described by the simple sinusoidal wave $a$ on the developed film. The two hatched areas under the curve A represent the exposed area which becomes black upon development. The double hatched area is the portion representing image growth which extends the outline of the area to curve $a$. The tip of the wave is also subject to image growth, but to a lesser extent than the valleys of the wave. The above description applies to frequencies which are relatively high, it being obvious that, for low frequencies, the wave distortion by image spread is correspondingly less, approaching zero distortion at zero frequency, although, even for zero frequency, a shift in value results from this same phenomenon. Thus, the network 10 includes reactive elements to alter the characteristics of the network with frequency.

Figure 2:
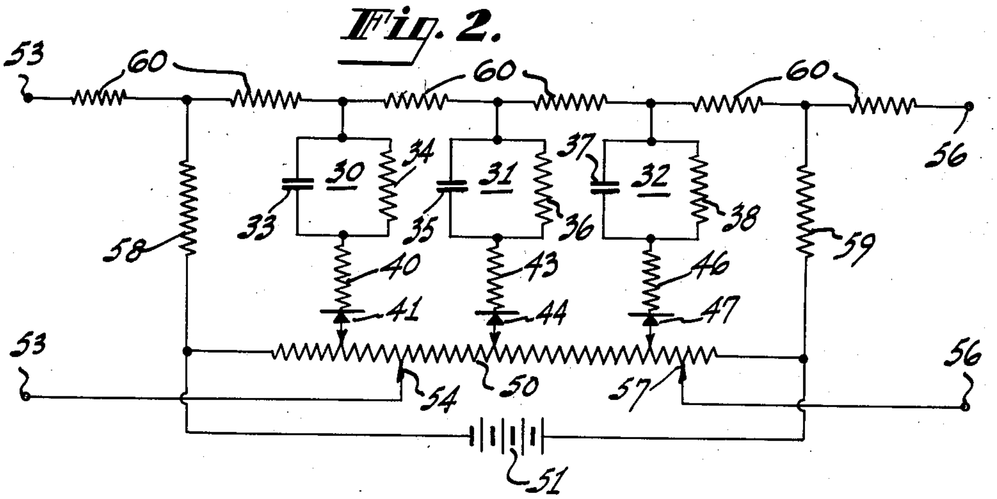
Fig. 2 is a schematic circuit diagram of the network used in the system of Fig. 1.

Referring now to Fig. 2, showing the details of the network employed at 10, this network is shown as including three equalizer T-type sections 30, 31, and 32, which form a ladder type, over-all network. While only three sections are shown, it is to be understood that more sections can and should preferably be used to obtain a desired response curve. The section 30 includes a condenser 33 and a resistor 34; the section 31 includes a condenser 35 and a resistor 36; and the section 32 employs a condenser 37 and a resistor 38. Included in the shunt arm of section 30, is a resistor 40 and a rectifier 41; in the shunt arm of section 31, is a resistor 43 and a rectifier 44; and in the shunt arm of section 32, is a resistor 46 and a rectifier 47. The sections also include respective series resistors 60. The rectifiers are connected to variable sliders for the purpose explained hereinafter. The direct current potential divider resistor 50 is connected to potential source 51, the connection of the rectifier to the resistor 50 being adjustable to establish the threshold voltage of conductivity of each respective section's shunt arm; hence, the attenuation of that section, resulting in the change in wave-form to be obtained.

The input circuit from terminals 53 has its lower side adjustably connected to the potentiometer 50 at point 54, while the output circuit across terminals 56 has its lower side adjustably connected to resistor 50 by slider 57. Thus, a Wheatstone bridge balance condition is obtained whereby, under quiescent conditions, no direct current potential from source 51 appears across the input and output terminals of the network. Input and output terminating resistors, included in the bridge circuit for obtaining this potential balance, are shown at 58 and 59, respectively.

The potentiometer adjustments are made in a manner that, under a quiescent condition, current flows through some rectifiers in the direction of their arrows, but not through others, and, in the present instance, current may flow through rectifiers 41 and 44, but not through rectifier 47. Then, when a signal of alternating voltage is applied to the input of the network, the wave values of positive polarity cause the shunt sections 30 and 31 to discontinue carrying current for the duration of the period during which positive polarity exceeds the thresholding voltages for which the rectifier potentiometer adjustments were made. Also, input waves of negative polarity exceeding a pre-set thresholding value will cause current to flow through sections 30 and 31 and also through section 32. Thus, the attenuation by the network is variable with instantaneous signal level and average signal level resulting in an output wave of altered shape, as will now be described in connection with Fig. 3, it being understood that the shapes may be predetermined by the choice of circuit constants and thresholding potential adjustments.

Figure 3:
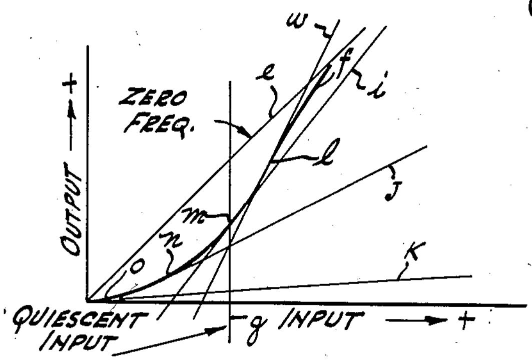
Fig. 3 is a graph showing the input and output characteristics of the network of Fig. 2.

Referring now to Fig. 3, showing the relationship between output and input voltages for the network 10, the straight line $e$ is the characteristic for zero frequency and curve $f$ is the characteristic for a frequency such as 5000 cycles, for instance. The slope of curve $f$ at any input point is the gain of the network at that point at the frequency represented by the curve. Thus, for input voltages more negative than the quiescent voltage, such as shown by vertical line $g$, more sections of the network become conductive and the gain becomes less, and, for input voltages more positive than the quiescent voltage, less sections become conductive and the gain becomes greater. The gain, at single points representing certain levels, is represented by the slopes of straight lines $h$, $i$, $j$, and $k$, which are drawn tangent to curve $f$ at points of different input amplitudes. For instance, curve $h$ shows the gain of network 10 at an amplitude $l$ of a 5000 cycle wave, at which point no section of the network is conducting. Curve $i$ shows the gain at point $m$ when only section 30 is conducting; curve $j$ shows the gain at point $n$ when sections 30 and 31 are conducting; and curve $k$ shows the gain at point $o$ when all three sections 30, 31, and 32 are conducting. Another distinction between the above described system and the system of the above-identified patent, is that the curve $f$ is the result of both the instantaneous amplitude and average amplitude of the wave from the noise reduction amplifier 11, the system thus responding to all frequencies including zero. That is, the output of unit 11 contributes to the instantaneous values of the input voltages to network 10 at any particular instant, resulting in an accurate pre-shaping of the entire complex electrical wave as impressed on modulator 13—14. The balancing out of voltages appearing at the terminals of the network by sliders 54 and 57 permits the network to be connected to any element or unit, regardless of their terminating impedances. The reactance elements 33, 35, and 37 in the cascaded T sections permit the network to properly adjust the wave shape in accordance with frequency.

There is thus provided a system whereby a pre-shaped wave of light variation is impressed on a film emulsion, which, upon development, will provide an image corresponding to the original signal wave shape, and which, upon reproduction, will provide the desired signal both with respect to amplitude and frequency, and for all constituent frequencies of complex waves.

The network may also be used to record variable density records, the pre-shaping of the wave being done in accordance with any preferred or desired gamma development of the negatives or prints. Furthermore, it is apparent that any desired exposure variation for either variable density or area may be obtained in the event that a departure from the original wave shape is desired to compensate for reproduction irregularities or variations.

I claim:

1. A sound recording system, comprising a source of alternating current signal, an optical recording system including a light beam modulator for varying a light beam in accordance with the instantaneous values and average values of the signal waves impressed thereon, a ground noise reduction amplifier connected between said source of signal and said modulator to vary said light beam in accordance with the average value of said signal, a transmission line between said source and said modulator, and a wave shaping network in said line intermediate said signal source, said ground noise reduction amplifier and said modulator for varying the instantaneous amplitude of the wave as impressed on said modulator in accordance with the instantaneous amplitude of said original wave and the average amplitude thereof.

2. A sound recording system, comprising a source of alternating current signal, an optical recording system including a light beam modulator for varying a light beam in accordance with the instantaneous values and average values of the signal waves impressed thereon, a ground noise reduction amplifier connected between said source of signal and said modulator to vary said light beam in accordance with the average value of said signal, a transmission line between said source and said modulator, and a wave shaping network in said line intermediate said signal source and said modulator for varying the instantaneous amplitude of the wave as impressed on said modulator in accordance with the instantaneous amplitude of said original wave and the average amplitude thereof, said last mentioned network including a plurality of sections shunted across said transmission line, each of said sections including a capacitance and resistance in parallel and in series with a rectifier.

3. A sound recording system in accordance with claim 2, in which a direct current potential source is provided, said rectifiers being biased therefrom to conduct current at different predetermined voltage levels.

4. In a wave shaping transmission system for varying light on a film in a direction to control processing variations of said film, the combination of a source of alternating current signals, means for obtaining a direct current varying in accordance with the average amplitude of said signals, a source of light, a light modulator for varying the light from said source in accordance with both the instantaneous values and average values of said signal, a transmission line between said source of alternating current signals and said light modulator, and a plural sectioned network in said line between said last mentioned means and said modulator for shifting the instantaneous position of said light beam as impressed on said film in accordance with the instantaneous amplitude of the original signals and the average amplitude thereof so that upon development of said film the image will correspond to the original wave shape of said signals.

5. In a wave shaping transmission system for varying light on a film in a direction to control processing variations of said film, the combination of a source of alternating current signals, means for obtaining a direct current varying in accordance with the average amplitude of said signals, a source of light, a light modulator for varying the light from said source in accordance with both the instantaneous values and average values of said signal, a transmission line between said source of alternating current signals and said light modulator, and a plural sectioned network in said line between said last mentioned means and said modulator for shifting the instantaneous position of said light beam as impressed on said film in accordance with the instantaneous amplitude of the original signals and the average amplitude thereof so that upon development of said film the image will correspond to the original wave shape of said signals, said network comprising a plurality of elements including resistors and biased rectifiers shunting said line, said elements including a plurality of reactance elements to vary the response of said network to said signals in accordance with the frequency of said signals.

6. A wave shaping transmission system in accordance with claim 5, in which a source of bias voltage is provided in said network, together with means for adjusting said voltage to zero at the terminals of said network.

7. A system for obtaining a wave shape of a signal as an image on a film after development, comprising means for light impressing said film with light modulated by said signal, and means for electrically varying the wave shape of said signal before impression on said light modulator in proportion to the image growth due to processing and in a direction to produce a final image on said film having a wave shape corresponding to the wave shape of the original signal, said means varying the transmission of each component frequency of said signal in a different amount in accordance with the frequency thereof, and varying the transmission of each component frequency of said signal in a different amount in accordance with the amplitude thereof.

8. A system for recording sound which provides a developed image having a wave shape corresponding to the wave shape of the original signal, comprising means for generating a light beam for impression on a film, means for generating an electrical current having a wave shape corresponding to the wave shape of signal waves to be recorded, means for generating an electrical current corresponding to the average variations in amplitude of said signal waves, and means for electrically varying the effect of both of said currents on said light beam simultaneously to shift both the instantaneous position of said light beam on said film in accordance with both the instantaneous amplitude of said original signal and the average amplitude thereof in an amount in a direction to compensate for image growth during processing of said film, said means varying the transmission of each component frequency of said signal in a different amount in accordance with the frequency thereof and varying the transmission of each component frequency of said signal in a different amount in accordance with the amplitude thereof.

9. In a photographic recording system in which light impressed on a film is modulated in accordance with current variations, a network for modifying the wave shape of the electrical currents from those of the original signal being recorded to obtain a predetermined film image, said network comprising a plurality of T-type sections connetced to form a ladder type network, each of said sections including a reactance element sensitive to the frequency of the signal in series with a rectifier element sensitive to the amplitude of the signal, and bias means for predetermining the point of current conduction of said rectifiers to provide said amplitude sensitivity, said means maintaining a zero potential difference at the input and output terminals of said network.

10. A network in accordance with claim 9, in which said last mentioned means includes a potentiometer resistor forming one side of said network and connected to a potential source, variable connections from the terminals of said network to said resistor, and a resistor connected from each end of said potentiometer resistor to the other side of said network.

FREDERICK G. ALBIN.

REFERENCES CITED

The following references are of record in the file of this patent:

UNITED STATES PATENTS

| Number | Name | Date |
|---|---|---|
| 2,002,214 | Albersheim | May 21, 1935 |
| 2,073,451 | Lord | Mar. 9, 1937 |
| 2,074,049 | Dimmick | Mar. 16, 1937 |
| 2,105,769 | Hansen | Jan. 18, 1938 |
| 2,227,906 | Kellogg | Jan. 7, 1941 |